(12) United States Patent
DeLuca et al.

(10) Patent No.: US 10,904,180 B2
(45) Date of Patent: Jan. 26, 2021

(54) EMOTICON ACKNOWLEDGMENT AND REACTION OF EMAIL FOR FAST FEEDBACK VISUALIZATION WITHOUT EMAIL OVERLOADING

(71) Applicant: INTERNATIONAL BUSINESS MACHINES CORPORATION, Armonk, NY (US)

(72) Inventors: Lisa Seacat DeLuca, Baltimore, MD (US); Kelley Anders, East New Market, MD (US); Jeremy R. Fox, Georgetown, TX (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 16/191,621

(22) Filed: Nov. 15, 2018

(65) Prior Publication Data

US 2020/0162411 A1    May 21, 2020

(51) Int. Cl.
*G06F 15/16* (2006.01)
*H04L 12/58* (2006.01)
*G06F 3/0481* (2013.01)
*G06Q 10/10* (2012.01)

(52) U.S. Cl.
CPC .......... *H04L 51/08* (2013.01); *G06F 3/04817* (2013.01); *G06Q 10/103* (2013.01); *G06Q 10/107* (2013.01); *H04L 51/18* (2013.01)

(58) Field of Classification Search
CPC ..... H04L 51/08; H04L 51/18; G06F 3/04817; G06Q 10/103; G06Q 10/107

USPC ........................................................ 709/206
See application file for complete search history.

(56) References Cited

U.S. PATENT DOCUMENTS

| | | | |
|---|---|---|---|
| 9,628,296 B2 | 4/2017 | Libin | |
| 9,716,680 B2 | 7/2017 | Taler | |
| 10,749,818 B1 * | 8/2020 | Bikumala | ............... H04L 51/02 |
| 2004/0141004 A1 | 7/2004 | Cabezas | |
| 2004/0243679 A1 * | 12/2004 | Tyler | .................... G06Q 10/107 709/206 |
| 2013/0173727 A1 * | 7/2013 | Libin | ................... H04L 51/063 709/206 |
| 2014/0173009 A1 * | 6/2014 | Denise | ................. G06Q 10/107 709/206 |

(Continued)

OTHER PUBLICATIONS

Cebrian, Jose; Reports of the Death of Email are Greatly Exaggerated; Huffington Post; Jul. 21, 2016; 3 pages.

*Primary Examiner* — Alan S Chou
(74) *Attorney, Agent, or Firm* — Schmeiser, Olsen & Watts, LLP; Michael O'Keefe

(57) ABSTRACT

A method, computer system, and/or computer program product for email processing. An email may be received by a plurality of recipients from a sender. An interactive icon may be integrated a summary display of the received email that provides at least one of the plurality of recipients' capability to provide a response to the received email. In response to a recipient of the plurality of recipients selecting the interactive icon, at least one emoticon may be displayed to the recipient for selection. In response to the recipient selecting from the at least one emoticon, the selected emoticon may be transmitted. The selected emoticon may be aggregated and displayed in respective summary displays of the at least one of the plurality of recipients or the sender.

20 Claims, 14 Drawing Sheets

(56) References Cited

U.S. PATENT DOCUMENTS

| | | | |
|---|---|---|---|
| 2014/0279418 A1* | 9/2014 | Rubinstein | G06Q 10/10 |
| | | | 705/39 |
| 2016/0246769 A1 | 8/2016 | Screen | |
| 2016/0344667 A1 | 11/2016 | Lane | |
| 2017/0147185 A1* | 5/2017 | Milvaney | G06F 3/0482 |
| 2017/0171267 A1* | 6/2017 | Cornell | G06Q 10/00 |
| 2018/0356957 A1* | 12/2018 | Desjardins | H04L 51/10 |
| 2019/0058682 A1* | 2/2019 | MacAskill | G06F 16/904 |
| 2019/0258382 A1* | 8/2019 | Clediere | G06Q 30/02 |
| 2020/0036669 A1* | 1/2020 | Duale | H04L 51/22 |

* cited by examiner

US 10,904,180 B2

EMOTICON ACKNOWLEDGMENT AND REACTION OF EMAIL FOR FAST FEEDBACK VISUALIZATION WITHOUT EMAIL OVERLOADING

TECHNICAL FIELD

The present invention relates to email processing using emoticons.

BACKGROUND

Despite the popularity of text messaging and social media, email remains an important mode of communication. For example, in some environments, such as business environments, email serves a vital function and purpose within the organization. It is common for an email to go out to a large group of people only to have everyone respond, which may inevitably clog an email inbox or put the contents of an email inbox out of focus. It is not uncommon for these kinds of problematic email threads for one participant to reply to all asking everyone else to not to reply to all. All these e-mail events, collectively add to the endless stream of emails accumulating on a specific topic, which may distract a user from an important message from outside of the problematic email thread.

SUMMARY

Embodiments of the present invention relate to a method, computer system, and/or computer program product for email processing. An email may be received by a plurality of recipients from a sender. An interactive icon may be integrated a summary display of the received email that provides at least one of the plurality of recipients capability to provide a response to the received email. In response to a recipient of the plurality of recipients selecting the interactive icon, at least one emoticon may be displayed to the recipient for selection. In response to the recipient selecting from the at least one emoticon, the selected emoticon may be transmitted. The selected emoticon may be aggregated and displayed in respective summary displays of the at least one of the plurality of recipients or the sender.

DETAILED DESCRIPTION

Figure 1:
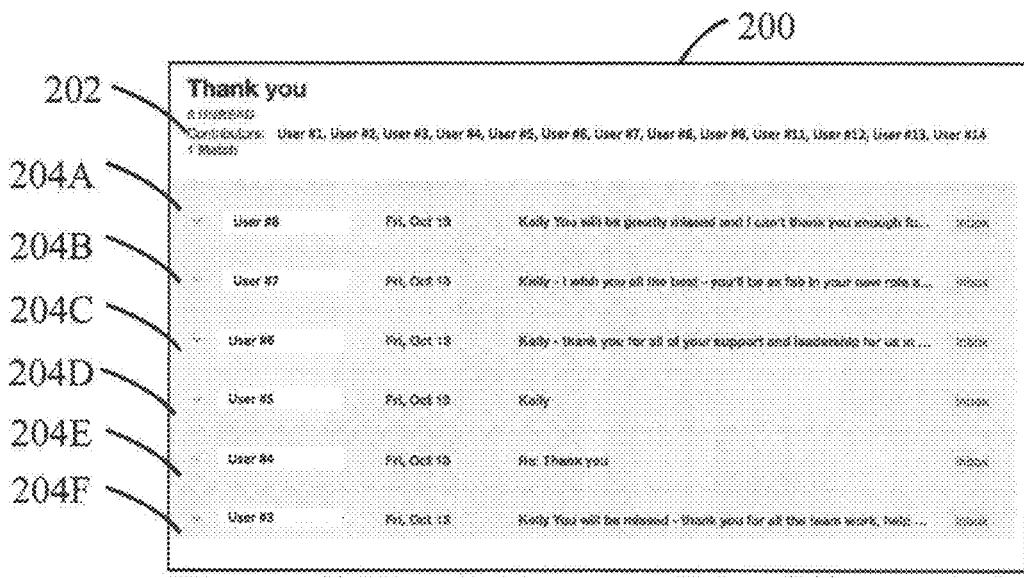
FIG. 1 illustrates an example of a summary display of an email inbox, in accordance with embodiments of the present invention.

FIG. 1 illustrates an example of a summary display 200 of an email inbox, in accordance with embodiments of the present invention. In this example, a first email 202 went out title "Thank You" and there are eight unread emails (e.g. including emails 204A through 204F) within a response period with either a single word or relatively short message such as "congratulations" or "we wish you the best". Although relatively little content is provided in those email messages, the predicament of multiple users replying to all does clog a summary display 200 of an email inbox. These messages 204A though 204F may be personal to one user and do not necessarily need to be shared for all to see, thus potentially clogging up a summary display 200 of an email inbox. However, given the lack of alternatives in some email systems, users often reply to all instead of replying to a single individual, sometimes because they want the group to know they acknowledge and react to the message. Embodiments relate to a method that allows individuals to react to emails and let everyone on the thread see their response without requiring or sending a full message causing the inbox to show the message as unread and distract message recipients.

Embodiments utilize the use of emoticons within e-mail processing and/or calendar events to allow individuals to quickly react and share their reaction with a subset of individuals. Embodiments allow for reduced e-mail and calendar processing time, while still getting the job done (communicating the message). By adding message sensitive emoticons to e-mail, embodiments allow the subject matter to be dynamically appealing in nature to be used as a social collaboration tool. However, in embodiments, but the original e-mail message is still intact within a user's normal e-mail account.

Embodiments may streamline workflow processing for e-mail. Embodiments may integrate across multiple languages and e-mail applications. Higher productivity while still utilizing the preexisting e-mail technology and function are objects of embodiments.

Figure 2:
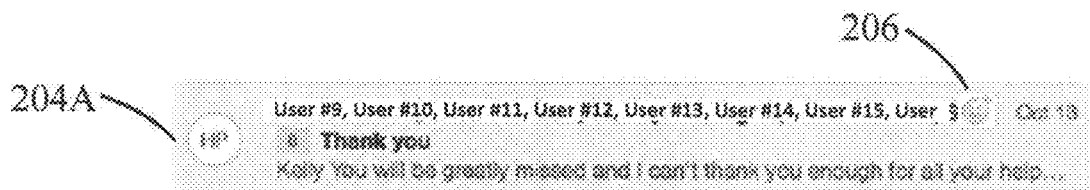
FIG. 2 illustrates an example email message comprising an interactive icon, in accordance with embodiments of the present invention.

FIG. 2 illustrates an example email message comprising an interactive icon, in accordance with embodiments of the present invention. As shown in FIG. 1, an original e-mail 202 may be sent out to a set or group of users. For example, in embodiments, a sender may want to make sure that everyone is in agreement with an original note, but the sender does not want to receive multiples replies or burden the recipients with multiple redundant replies. In embodiments, a user may have an e-mail or calendaring event and want to communicate a cancellation message. In embodiments, a user may want to quickly and/or efficiently poll a group of people through email and visualize the responses. Embodiments allow for an emoticon response. For example, as shown in FIG. 2, a new icon button 206 may be provided in an email 204A within the summary display 200 of an email inbox, in accordance with embodiments. For example, a new icon 206 may appear once the message 204A is opened.

In some embodiments, as the user starts to reply with text, if the text is shorter than a predetermined (e.g. five words) or dynamically determined length (e.g. by artificial intelligence), an email processing method may suggest an emoticon response. In embodiments, if text input includes keywords, an email processing method may suggest an emoticon response.

In some embodiments, email recipients may see new emoticons as they come in but the email message itself is not marked as a new message.

In embodiments, additional contextual information may optionally be made available. For example, in embodiments, when hovering over a displayed emoticon, a list of users may be shown that have reacted with that emoticon. For example, in embodiments, by clicking on an emoticon, a new message or thread could be started directed at only those users that replied with that emoticon. In embodiments, a may select multiple emoticons.

In embodiments, if a message requires a certain amount of responses from people, The sender of the message may optionally require a number of responses that are needed before sending a follow up email as a reminder.

In embodiments, a user may be able to sort their email by items that have been recently responded to. For example, in embodiments, as new emoticons come in, the emails should bubble up to the top of the list to have the most up-to-date count of responses.

In embodiments, an original e-mail may still be intact, but the social collaboration (acceptance or rejection) of the event or message may been dynamically recorded through emoticon images. In embodiments, a sender may see a real-time dynamic view without having to review more e-mail and notification events.

Figure 3:
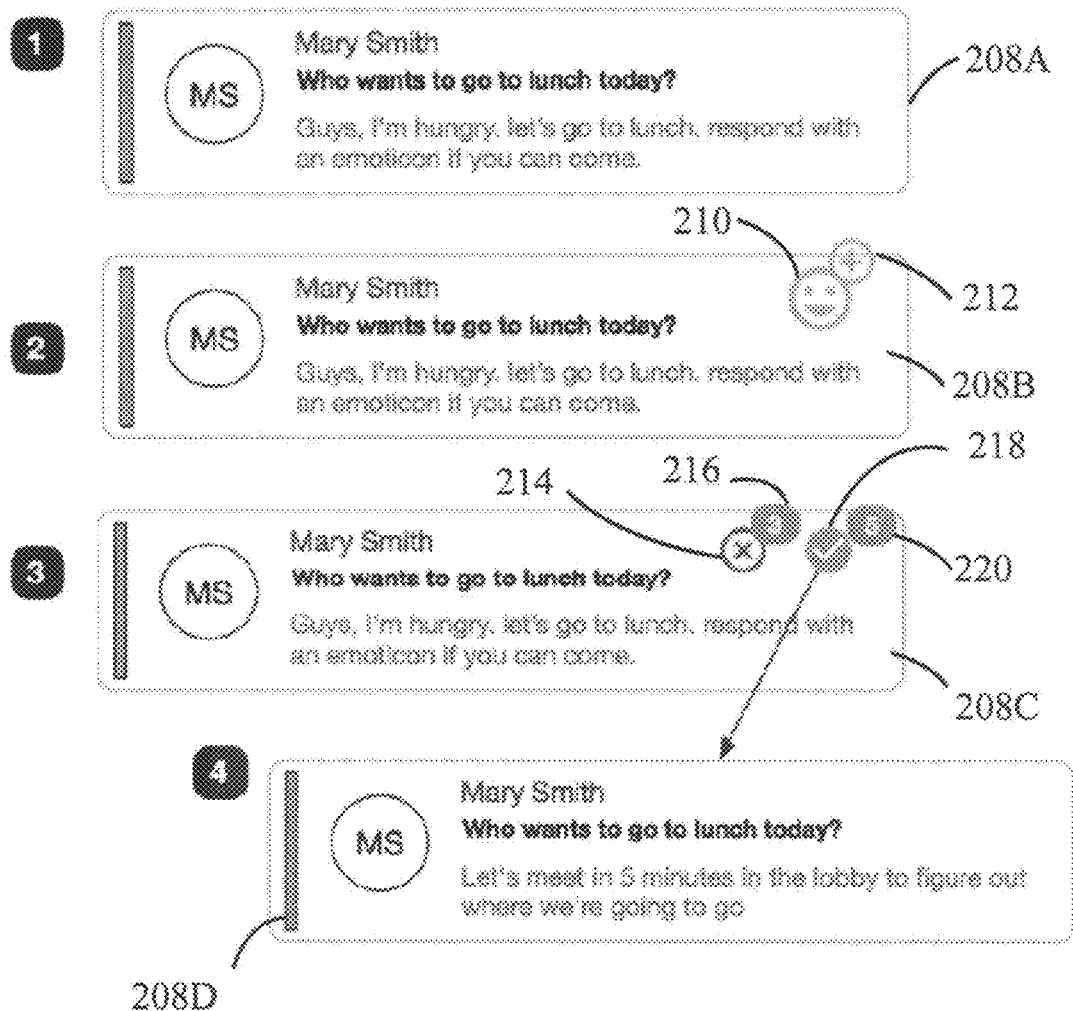
FIG. 3 illustrates an example email message in an emoticon selection process, in accordance with embodiments of the present invention.

FIG. 3 illustrates an example email message 208 in an emoticon selection process, in accordance with embodiments of the present invention. In this example, an email user (e.g. fictitious Mary) sends an email 208A to other users in her organization and asks "Who wants to go to lunch today?" Rather than flood everyone's inboxes with yes/no/maybe responses that Mary would have to individually open and figure out what each response is, embodiments provide an emoticon 210 response that may be selected by email recipients. For example, in email message 208A, an emoticon 210 is a smiley face emoticon. As responses come in, everyone in the email group may see emoticons 214 and 218 appear in their email inboxes as shown in message 208C. For example, as shown in email message 208C, Mary sees that five coworkers said yes from selecting the "+1" icon 212 of email message 208B, while three coworkers said no with a no (i.e. "x") emoticon 214. Mary is able to click on the +1 icon 218 and compose a message to the five who said yes saying, "Let's meet in 5 minutes in the lobby to figure out where we're going to go" as shown in message 208D.

In embodiments, a selected emoticon comprises a counter 216, 218 representing a volume of responses associated with the selected emoticon.

Figure 4:
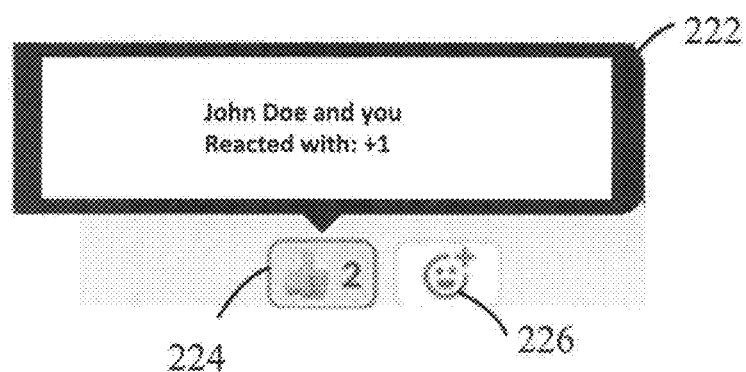
FIG. 4 illustrates an example email having an emoticon with identification of a recipient and their selected emoticon reaction, in accordance with embodiments of the present invention.

FIG. 4 illustrates an example email having an emoticon with identification of a recipient and their selected emoticon reaction, in accordance with embodiments of the present invention. In the example illustrated in FIG. 4, a balloon 222 may be activated associated with emoticon 224. This activation may be performed by hovering a mouse of similar interactions with a user interface. In this example, balloon 222 shows that one other user had a similar or same emoticon reaction by stating "John Doe and you Reacted with: +1". Emoticon button 226 may be provided, in accordance with embodiments, to allow a user to add, supplement, or originally indicate an emoticon to an email inquiry.

Figure 5:
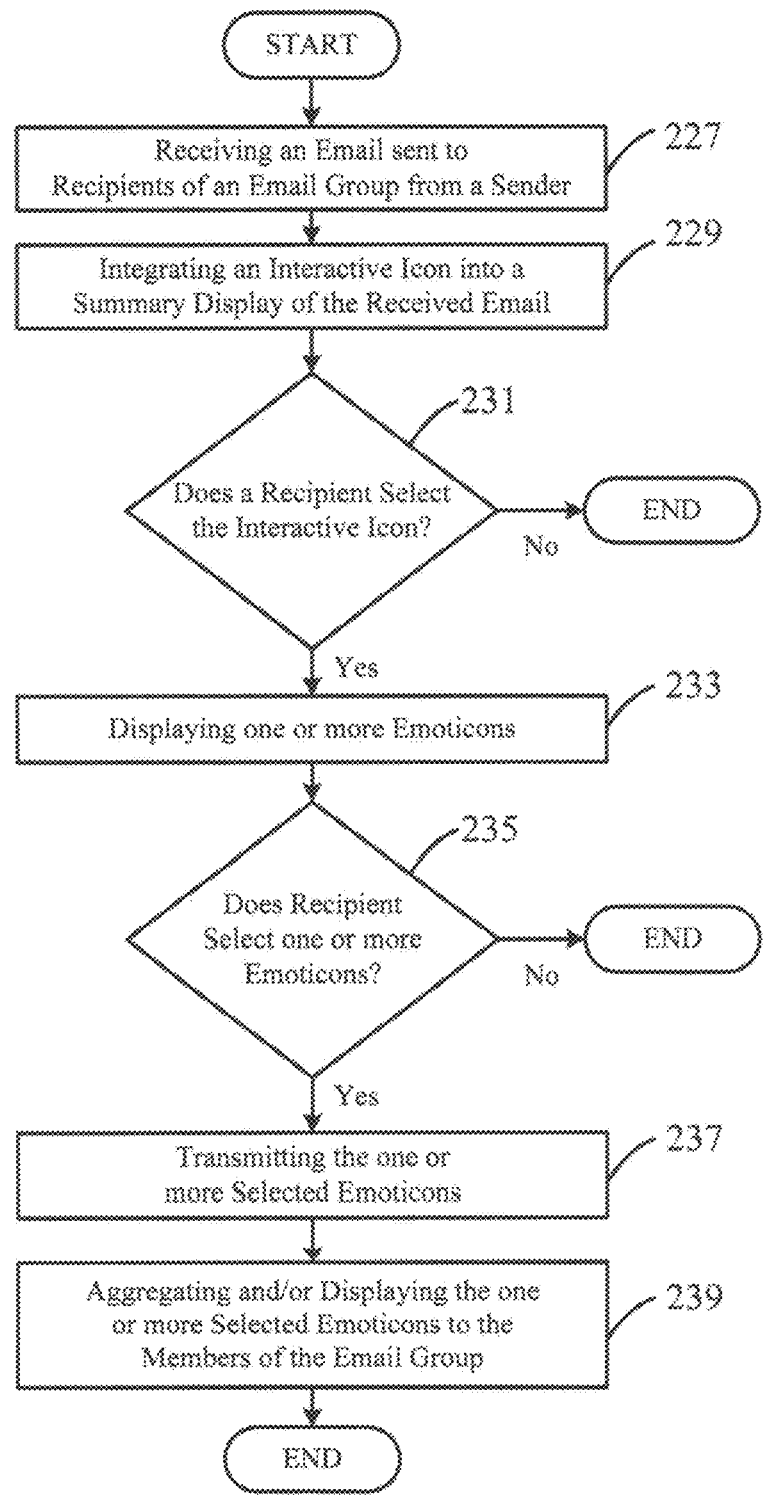
FIG. 5 illustrates an example method of displaying an emoticon integrated into an email message, in accordance with embodiments of the present invention.

FIG. 5 illustrates an example method of displaying an emoticon integrated into an email message, in accordance with embodiments of the present invention.

Embodiments relate to a method of email processing performed by one or more processors. In embodiments, in step 227, a method includes receiving an email sent to a plurality of recipients from a sender. Step 227 may be preceded or include other sub-steps or decisions not specifically detailed, in accordance with embodiments.

In embodiments, after step 227, in step 229, an interactive icon may be integrated into a summary display of the received email that provides at least one of the plurality of recipients capability to provide a response to the received email. Step 227 may be preceded or include other sub-steps or decisions not specifically detailed, in accordance with embodiments.

In embodiments, after step 229, at decision 231, in response to a recipient of the plurality of recipients selecting an interactive icon, it may be decided if a recipient selected an interactive icon. At decision 231, if it is determined that a recipient did not select an interactive icon, then the process may end, in accordance with embodiments. If the process ends, then other supplemental or sub-steps may be performed in accordance with embodiments. Decision 231 may be preceded or include other sub-steps or decisions not specifically detailed, in accordance with embodiments.

At decision 231, if it is determined that a recipient did select an interactive icon, then the method may proceed to step 233, in accordance with embodiments. In step 233, at least one emoticon may be displayed to a recipient for selection. Step 233 may be preceded by other steps not specifically detailed and may include other sub-steps, in accordance with embodiments.

In embodiments, after step 233, at decision 235, in response to a recipient selecting an emoticon, a method determines if the recipient selected an emoticon. At decision 235, if it is determined that a recipient did not selected an emoticon, then the process may end, in accordance with embodiments. If the process ends, then other supplemental or sub-step may be performed in accordance with embodiments. Decision 235 may be preceded or include other sub-steps or decisions not specifically detailed, in accordance with embodiments.

At decision 235, if it is determined that a recipient did select an emoticon, then a method may proceed to step 237, in accordance with embodiments. In step 237, in response to the recipient selecting from the at least one emoticon, a method may transmit a selected emoticon, in accordance with embodiments. In embodiments, an emoticon may be transmitted to at least one recipient and/or an original sender (e.g. an example email group) though a variety of email processing arrangement and/or systems.

In embodiments, after step 237, in step 239, a method may aggregate and/or display one or more selected emoticons to members of an email group. Step 239 may be preceded or include other sub-steps or decisions not specifically detailed, in accordance with embodiments. After step 239, a process may end, in accordance with embodiments. If the process ends, then other supplemental or sub-steps may be performed in accordance with embodiments.

In embodiments, members of an email group may select no emoticons, a single emoticon, and/or a plurality of emoticons. The utility of either selecting or not selecting emoticons is to allow email users to efficiently and pragmatically communicate within an email group without clogging an email inbox. Embodiments allow a user to express their communications through flexible selection of emoticons. For example, multiple emoticons may be available for selection. One user may express their intended communication by selected a single emoticon (e.g. such as a thumbs-up emoticon signalling availability for lunch). Another user may select two emoticons (e.g. such as both a thumbs-up emoticon and a hamburger emoticon signally availability for lunch and a preference for hamburgers). Yet another user may not select any emoticon at all, which in view of platforms appreciated by embodiments may signal that this user is not interested in lunch. Such a user may alternatively select a negative emoticon (e.g. an "x" mark) to signal unavailability. These examples are for illustrative purposes of embodiments.

In embodiments, a recipient of the plurality of recipients reacts to the received email by selecting an emoticon. At least one of the plurality of recipients and/or the sender (e.g. the email group) may see the selected emoticon response in the respective summary displays without requiring sending of an email response message 233. Thus, in accordance with embodiments, efficient and/or pragmatic communication can be accomplished using emoticons without clogging an email inbox with redundant messages.

In embodiments, email processing is a social collaboration sub-communication protocol that minimizes clutter in email inboxes. In embodiments, the received email comprises at least one calendar event. In embodiments, the email processing utilizes the at least one emoticon to allow at least one of the plurality of recipients or the sender to quickly react and share their reaction with others of the plurality of recipients or the sender. In embodiments, the method minimizes time spent by at least one of the plurality of recipients or the sender in reviewing emails using the selected emoticon.

In embodiments, the email processing adds message sensitive content to the received email as the selected emoticon as a dynamic social collaboration tool between the plurality of recipients and the sender. In embodiments, the email processing streamlines the workflow processing of the received email. In embodiments, the email processing integrates across multiple languages and email applications. In embodiments, the email processing communicates a cancellation of a calendaring event. In embodiments, the email processing polls the plurality of recipients or the sender.

In embodiments, the displaying the selected emoticon is performed in substantially real time in relation to selection by the plurality of recipients of the selected emoticon. In embodiments, the displaying the selected emoticon is a sub category of the email. In embodiments, the displaying the selected emoticon is not a new email message. In embodiments, additional contextual information is appended to supplement the selected emoticon. In embodiments, on hover, a method shows a list of the users that have reacted with the selected emoticon. In embodiments, by clicking on the selected emoticon, a method starts at least one of a new message or thread directed at only those users that replied with the selected emoticon. In embodiments, the recipient selects multiple emoticons.

Figure 6:
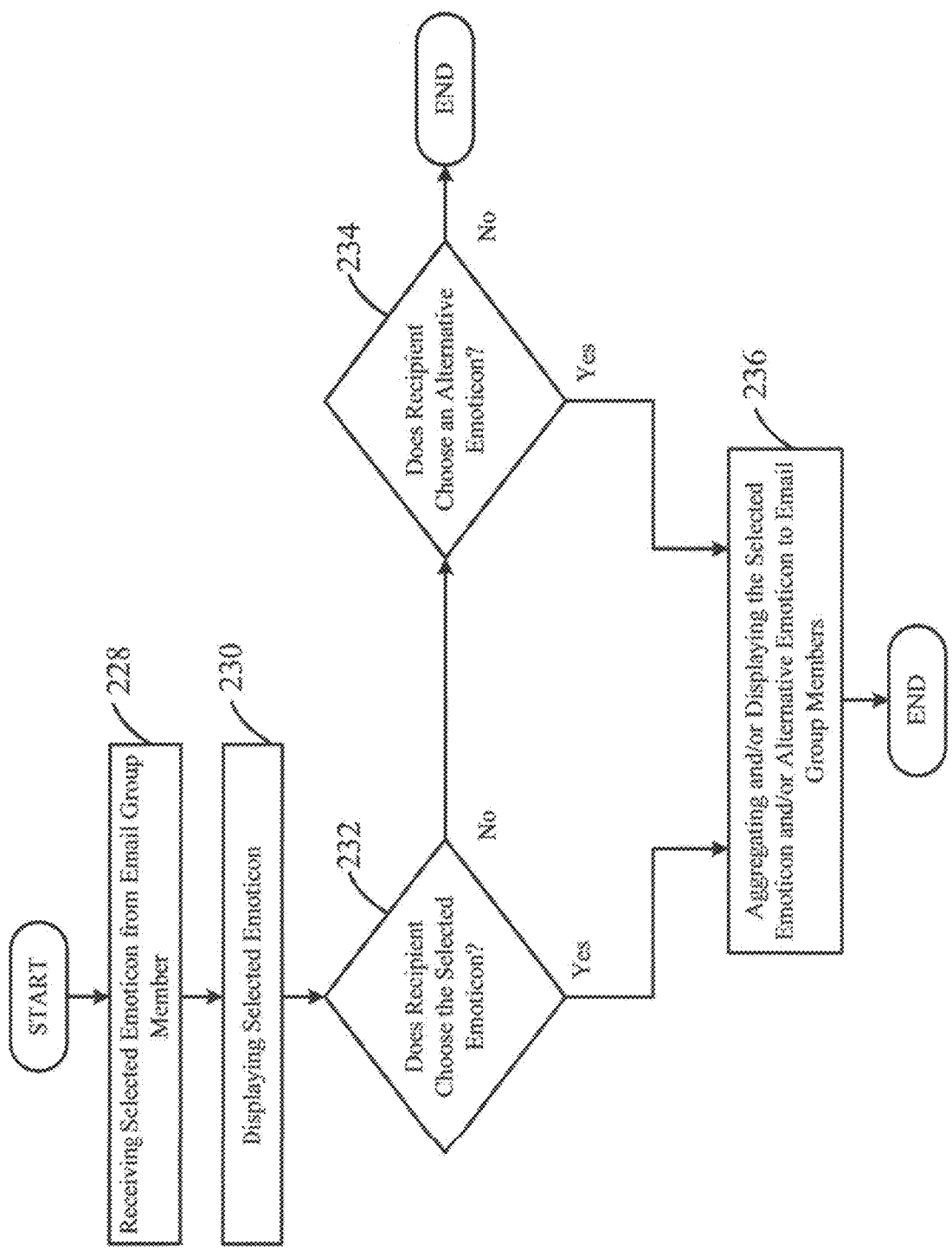
FIG. 6 illustrates an example method of selecting an emoticon integrated into an email message, in accordance with embodiments of the present invention.

FIG. 6 illustrates an example method of selecting an emoticon integrated into an email message, in accordance with embodiments of the present invention. In embodiments, in step 228, a method includes receiving a selected emoticon from an email group member. In step 230, a selected emoticon may be displayed to members of the email group. Step 228 and/or 230 may be preceded or include other sub-steps or decisions not specifically detailed, in accordance with embodiments. For example, in embodiment, prior to steps 228 and/or 230, a method including at least some of the steps shown in FIG. 5 may be implemented. In embodiments, steps 228 and/or 230 of FIG. 6 may overlap with step 239 of FIG. 5.

In embodiments, after steps 228 and/or 230, at decision 232, in response to a recipient viewing the emoticon selected by another user, that recipient may also select the emoticon that was selected by another user to signal agreement and/or another aggregated communication with the email group. At decision 232, if the recipient also selects the emoticon that was received from another user, the process proceeds to step 236. At step 236, the emoticon selected by the user is aggregated and/or displayed to the email group members.

At decision 232, in response to a recipient not selecting the received emoticon, the process may proceed to decision 234, in accordance with embodiments. At decision 234, a recipient may choose an alternative emoticon which is different than the received emoticon. For example, the originally received emoticon may be a thumbs-up symbol signaling that the original emoticon from the sender is available for lunch. In this example, at decision 234, if the recipient wishes to indicate that they are not available for lunch, the recipient may select an alternative emoticon that is a thumbs-down symbol. At decision 234, if it is determined that the recipient chose an alternative emoticon, then the process may proceed to step 236, such that the selected alternative emoticon is aggregated and/or displayed to the email group members. At decision 234, if it is determined that the recipient chooses neither the received emoticon nor an alternative emoticon, then the process may end. Decision 234 may be preceded or include other sub-steps or decisions not specifically detailed, in accordance with embodiments. If the process ends, then other supplemental or sub-steps may be performed in accordance with embodiments.

Figure 7:
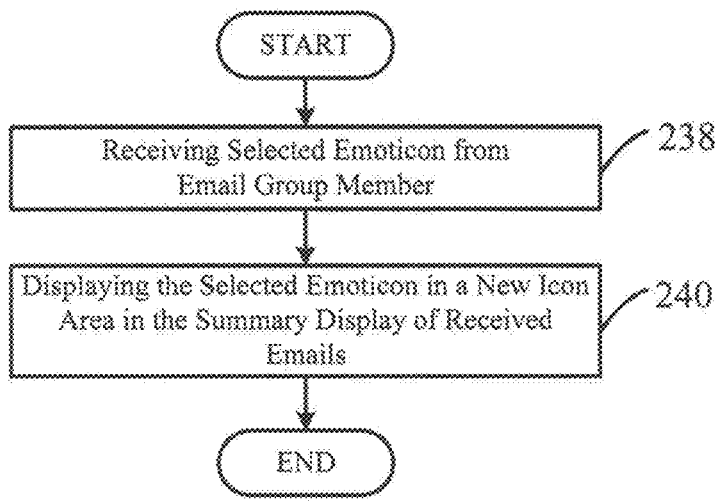
FIG. 7 illustrates an example method of displaying a new emoticon area, in accordance with embodiments of the present invention.

FIG. 7 illustrates an example method of displaying a new emoticon area, in accordance with embodiments of the present invention. In step 238, an email group member may receive a selected emoticon from another email group member. After step 238, in step 240, the selected emoticon from another email group member may be displayed in a new icon area in a summary display of received emails. After step 240, the process may end. If the process ends, then other supplemental or sub-steps may be performed in accordance with embodiments.

In embodiments, at least one of the plurality of recipients or the sender receives the selected emoticon 238. In embodiments, a new icon area including the selected emoticon is displayed within the summary display of the at least one of the plurality of recipients or the sender 240. In embodiments, the new icon area appears once the received email is opened 246.

Figure 8:
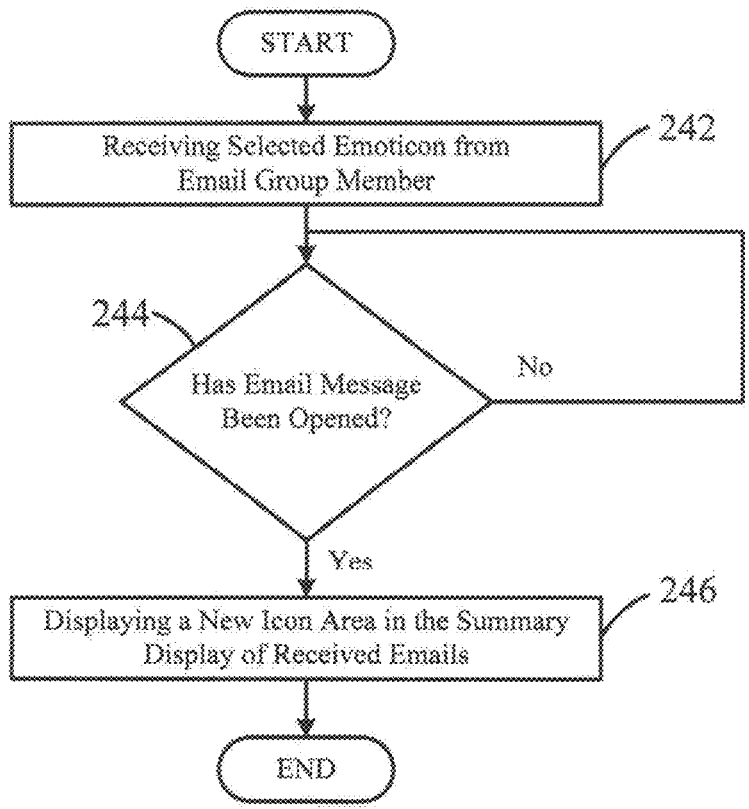
FIG. 8 illustrates an example method of displaying a new emoticon area after an email message has been opened, in accordance with embodiments of the present invention.

FIG. 8 illustrates an example method of displaying a new emoticon area after an email message has been opened, in accordance with embodiments of the present invention. In step 242, an emoticon selected from an email group member may be received. After step 242, at decision 244, it may be determined if the recipient has opened the email message associated with the received emoticon. If it is determined that the email message has not been opened, then in step 244 the process loops back to the beginning of decision 244 until the email message has been opened. At decision 244, at step 246, if the email message with the associated received emoticon is opened, then a new icon area in a summary display area of received emails may be displayed. After step 246, the process may end. If the process ends, then other supplemental or sub-steps may be performed in accordance with embodiments. In embodiments, the new icon area appears once the received email is opened 246.

Figure 9:
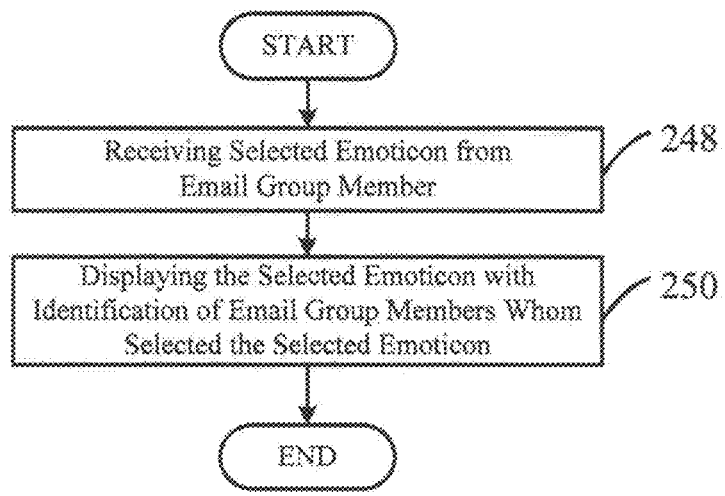
FIG. 9 illustrates an example method of displaying selected emoticons with identification of email group members whom selected the selected emoticon, in accordance with embodiments of the present invention.

FIG. 9 illustrates an example method of displaying selected emoticons with identification of email group members whom selected the selected emoticon, in accordance with embodiments of the present invention. At step 248, an emoticon selected from an email group members may be received. After step 248, at step 250, selected emoticons from other email group members may be displayed. In embodiments, selected emoticons from other email group members may be displayed with identification and/or indicated of identification of email group members who selected particular emoticons. In embodiments, a new icon area comprises identification of at least one of the plurality of recipients or the sender associated with the selected emoticon 250. After step 250, the process may end. If the process ends, then other supplemental or sub-steps may be performed in accordance with embodiments.

Figure 10:
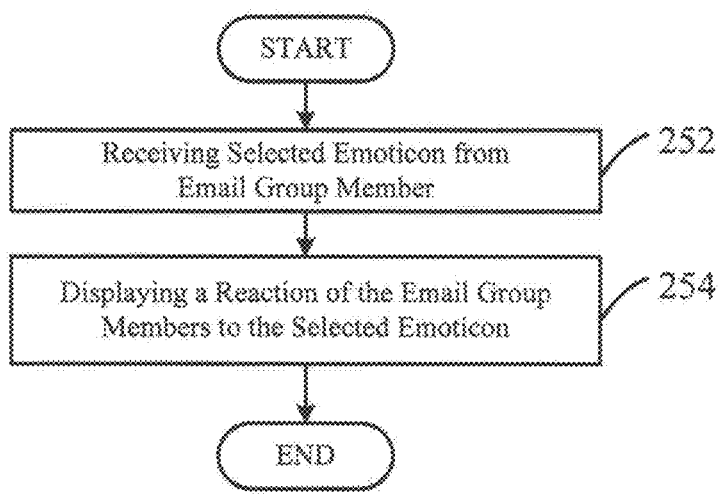
FIG. 10 illustrates an example method of displaying a reaction of a selected emoticon, in accordance with embodiments of the present invention.

FIG. 10 illustrates an example method of displaying a reaction of a selected emoticon, in accordance with embodiments of the present invention. At step 252, an emoticon selected from an email group members may be received. After step 252, at step 254, reactions to the selected emoticon from other email group members may be displayed. In embodiments, a new icon area comprises a reaction of at least one of the plurality of recipients or the sender shown next to the selected emoticon 254. After step 254, the process may end. If the process ends, then other supplemental or sub-steps may be performed in accordance with embodiments.

Figure 11:
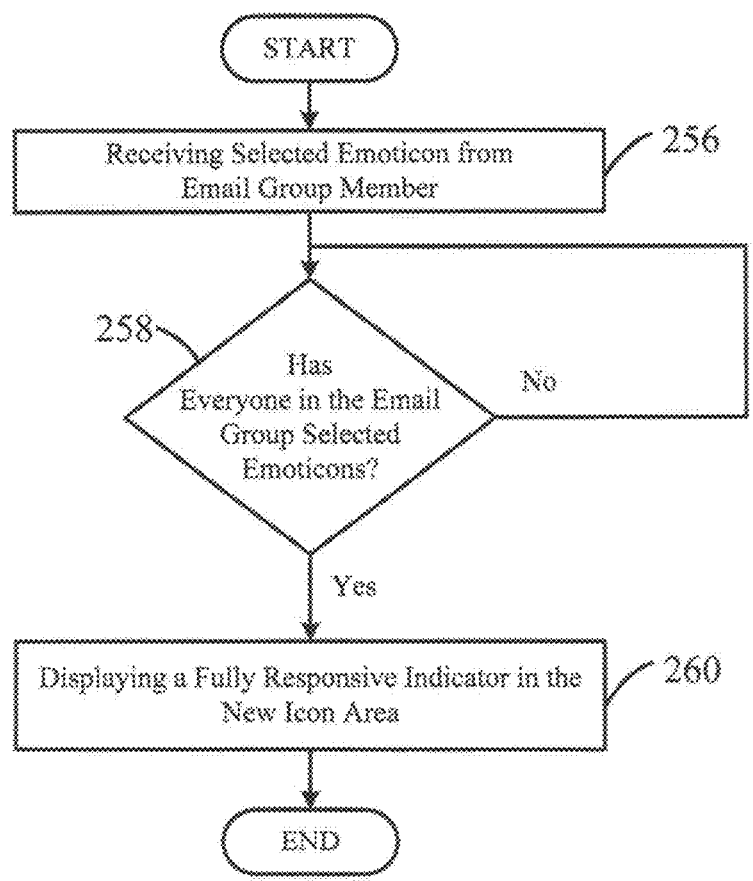
FIG. 11 illustrates an example method of displaying a fully responsive indicator when all members of an email group select emoticons, in accordance with embodiments of the present invention.

FIG. 11 illustrates an example method of displaying a fully responsive indicator when all members of an email group select emoticons, in accordance with embodiments of the present invention. At step 256, an emoticon selected from an email group members may be received. After step 256, at decision 256, it may be determined if everyone in the email group has selected emoticons associated with the underlying email. If it is determined that not all of the email group members have selected emoticons, then the process loops back to the beginning of decision 258 until emoticons have been selected by all members of an email group. After decision 258, at step 260, if all of the email group members have selected an emoticon, then an indicator may be displayed indicating to the users that all members have reacted by selecting emoticons, which provides for pragmatic and/or efficient communication without clogging an email inbox. In embodiments, a new icon area comprises a fully responsive indicator indicating that all of the plurality of recipients have responded by selecting at least one of the plurality of emoticons 260.

Alternatively, in embodiments, indicators of substantially responsive, partially responsive, non-responsiveness, and/or any other pragmatic indicators may be displayed if less than all of the email group members were responsive. After step 260, the process may end. If the process ends, then other supplemental or sub-steps may be performed in accordance with embodiments.

Figure 12:
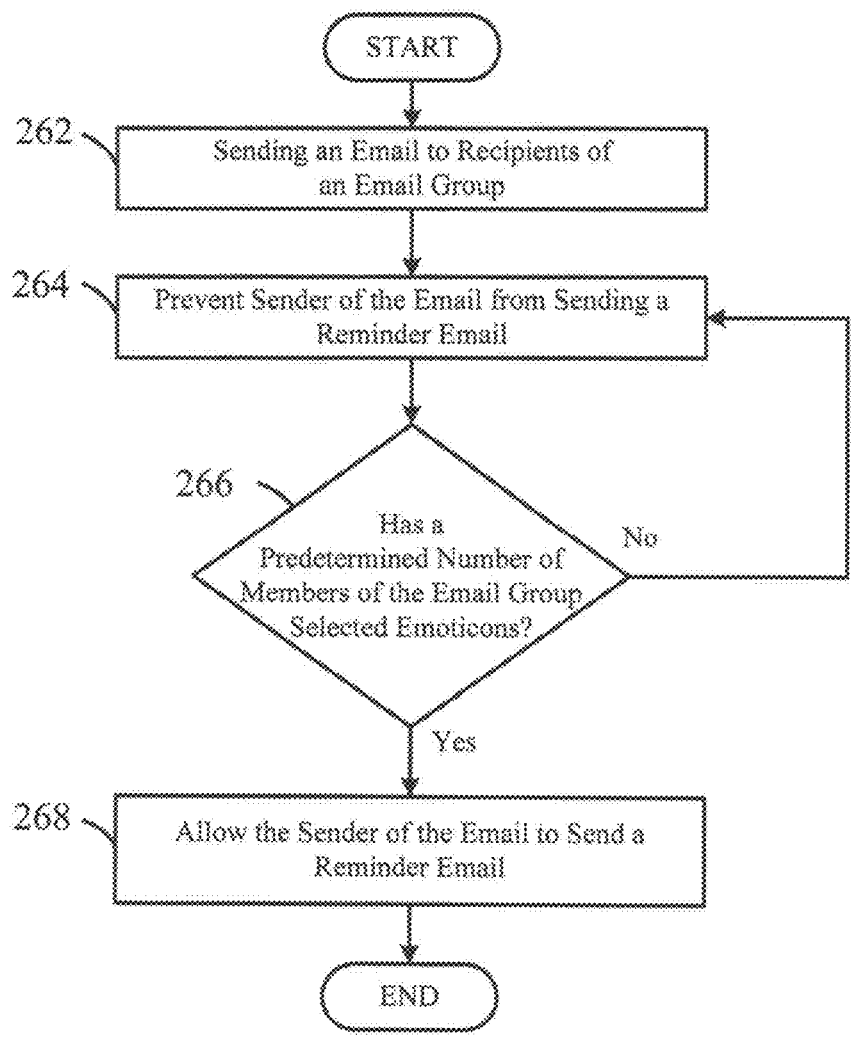
FIG. 12 illustrates an example method of preventing premature reminder email messages, in accordance with embodiments of the present invention.

FIG. 12 illustrates an example method of preventing premature reminder email messages, in accordance with embodiments of the present invention. At step 262, an email may be sent by a user to a group of recipients in an email group. After step 262, at step 264, the sender of the email may be prevented from sending a reminder email, in accordance with embodiments. Given that one of the objectives of embodiments is to prevent email clutter, the purpose of step 264 may be to prevent the clogging of an email inbox. After step 264, at decision 266, it may be determined if a predetermined number of members of the email group selected emoticons. At decision 266, if a predetermined number of email group members have not selected emoticons, then the process loops back to step 264, in accordance with embodiments, thus preventing the original sender from sending follow-up emails. At decision 266, if a predetermined number of email group member have selected emoticons, then the process proceeds to step 268. At step 268, the sender may be authorized to send a reminder or follow-up email to the recipients. In embodiments, if the received email requires a predetermined number or dynamically determined number of responses from the plurality of recipients 266, the sender requires the predetermined number or the dynamically determined number of responses that are needed before sending a follow-up email as a reminder.

Figure 13:
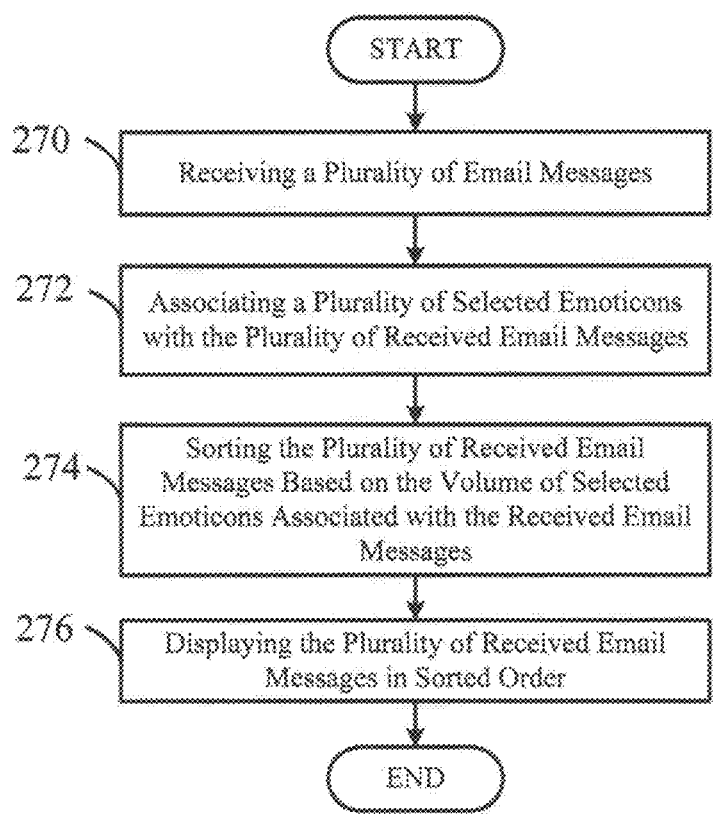
FIG. 13 illustrates an example method of sorting emails based on selected emoticons, in accordance with embodiments of the present invention.

FIG. 13 illustrates an example method of sorting emails based on selected emoticons, in accordance with embodiments of the present invention. In step 270, a user may receive a plurality of emails from a variety of users, where at least some of these email messages have associated emoticons. After step 270, at step 272, a process may associate one or more selected emoticons with the plurality of received email messages. After step 272, at step 274, a process may sort the one or more received email messages based on a volume of selected emoticons associated with the received email messages. After step 274, at step 276, a process may cause directly and/or indirectly the received email messages to appear in the sorted order.

Figure 14:
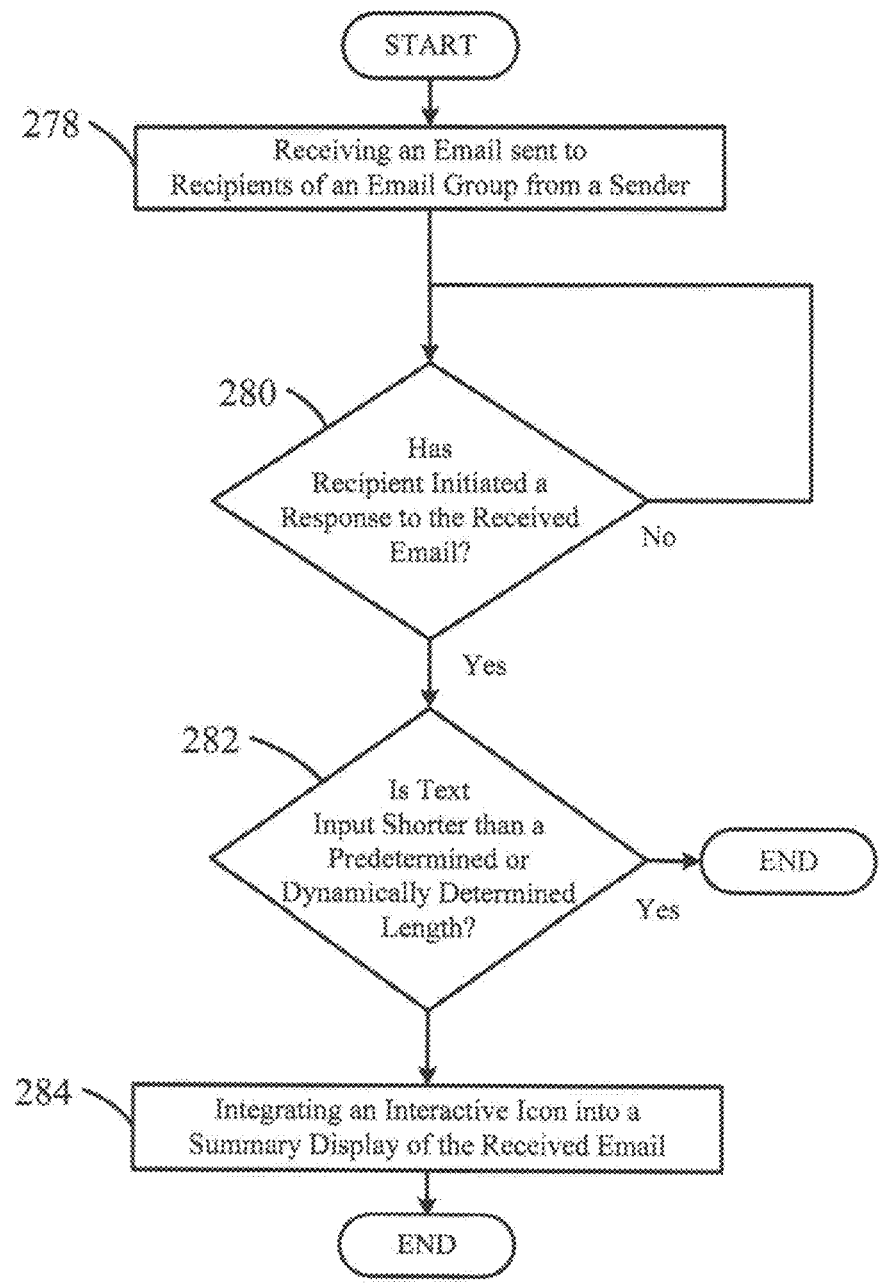
FIG. 14 illustrates an example method of providing emoticon responses if text input is shorted than a predetermined or dynamically determined length, in accordance with embodiments of the present invention.

FIG. 14 illustrates an example method of providing emoticon responses if text input is shorter than a predetermined or dynamically determined length, in accordance with embodiments of the present invention. At step 278, in embodiments, an email to an email group may be received from a sender. After step 278, at decision 280, it may be determined if a recipient initiated a response to the received email. If at decision 280, it is determined that a recipient has not initiated a response to the received email, then the process loops back to the input of decision 280 until a user initiates a response to the received email. If at decision 280, it is determined that a recipient has initiated a response to the received email, then the process continues to decision 282. At decision 282, if it is determined that the input text is shorter than a predetermined and/or dynamically determined length, then the process proceeds to step 284. At step 284, in accordance with embodiments, if the text length is shorter than a predetermined and/or dynamically determined length, then the process uses the text to suggest and/or automatically use an emoticon associated with that text. At step 284, the selected emoticon may be integrated into an interactive icon of a summary display of emails.

Figure 15:
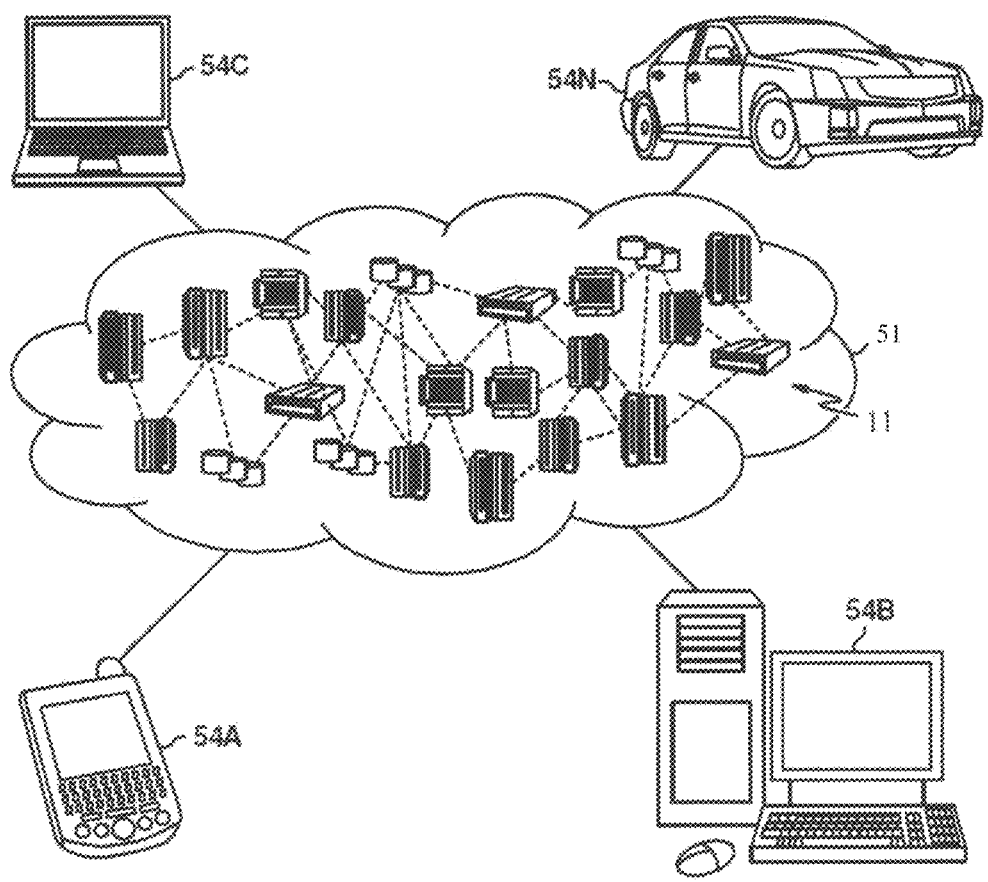
FIG. 15 depicts a cloud computing environment according to embodiments of the present invention.

FIG. 15 depicts a cloud computing environment according to embodiments of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 15, illustrative cloud computing environment 51 is depicted. As shown, cloud computing environment 51 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 51 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 51 can communicate with any type of computerized device over any type of network and/or network addressable connection (e.g., using a web browser).

Figure 16:
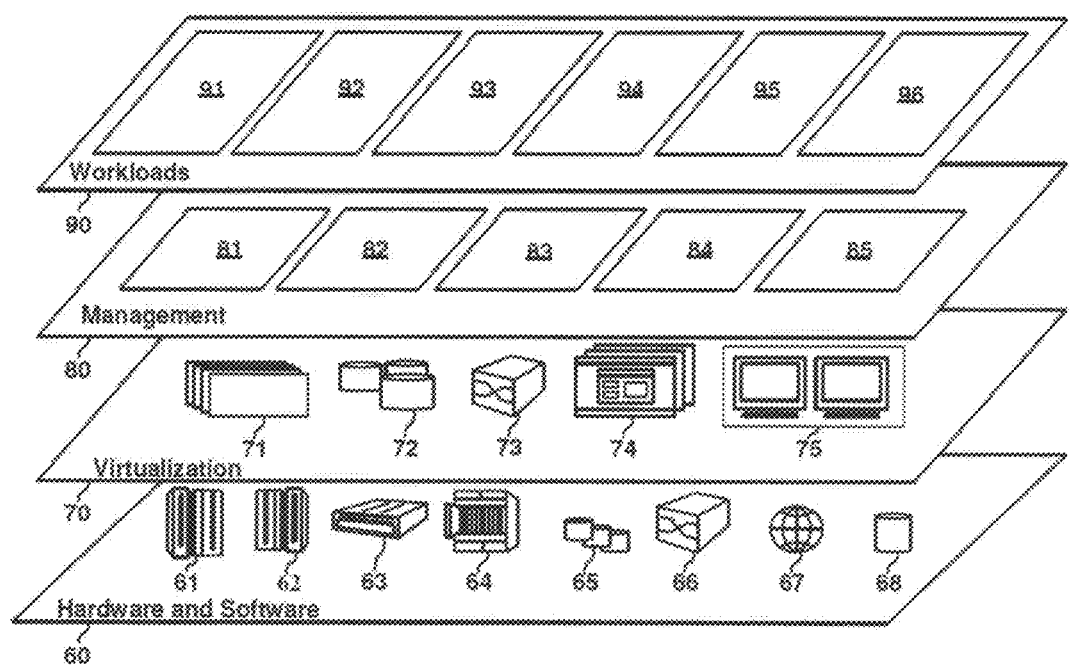
FIG. 16 depicts abstraction model layers according to embodiments of the present invention.

Referring now to FIG. 16, a set of functional abstraction layers provided by cloud computing environment 51 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and email processing using emoticons 96.

Figure 17:
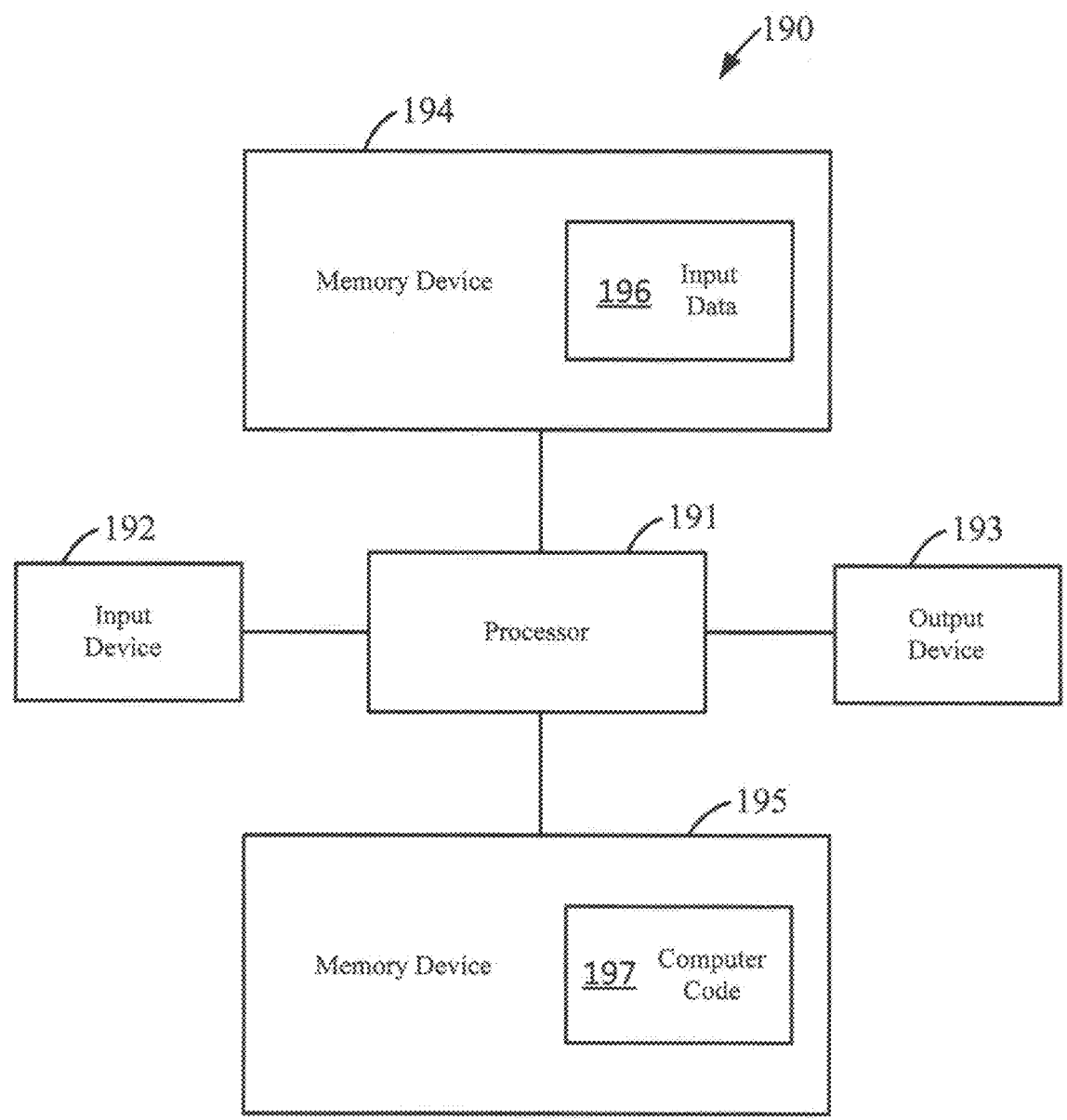
FIG. 17 illustrates a computer system used for implementing the methods associated with embodiments of the present invention.

FIG. 17 illustrates a computer system 190 used for implementing the methods of the present invention. The computer system 190 includes a processor 191, an input device 192 coupled to the processor 191, an output device 193 coupled to the processor 191, and memory devices 194 and 195 each coupled to the processor 191. The input device 192 may be, inter alia, a keyboard, a mouse, etc. The output device 193 may be, inter alia, a printer, a plotter, a computer screen, a magnetic tape, a removable hard disk, a floppy disk, etc. The memory devices 194 and 195 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 195 includes a computer code 197 which is a computer program that includes computer-executable instructions. The computer code 197 includes software or program instructions that may implement an algorithm for implementing methods of embodiments of the present invention. The processor 191 executes the computer code 197. The memory device 194 includes input data 196. The input data 196 includes input required by the computer code 197. The output device 193 displays output from the computer code 197. Either or both memory devices 194 and 195 (or one or more additional memory devices not shown in FIG. 17) may be used as a computer usable storage medium (or program storage device) having a computer readable program embodied therein and/or having other data stored therein, wherein the computer readable program includes the computer code 197. Generally, a computer program product (or, alternatively, an article of manufacture) of the computer system 190 may include the computer usable storage medium (or said program storage device).

The processor 191 may represent one or more processors. The memory device 194 and/or the memory device 195 may represent one or more computer readable hardware storage devices and/or one or more memories.

Thus embodiments of the present invention discloses a process for supporting, deploying and/or integrating computer infrastructure, integrating, hosting, maintaining, and deploying computer-readable code into the computer system 190, wherein the code in combination with the computer system 190 is capable of implementing the methods of embodiments of the present invention.

While FIG. 17 shows the computer system 190 as a particular configuration of hardware and software, any configuration of hardware and software, as would be known to a person of ordinary skill in the art, may be utilized for the purposes stated supra in conjunction with the particular computer system 190 of FIG. 17. For example, the memory devices 194 and 195 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of embodiments may include one or more computer readable hardware storage devices having computer readable program code stored therein, said program code containing instructions executable by one or more processors of a computing system (or computer system) to implement the methods of the present invention.

A computing system (or computer system) of embodiments may include one or more processors, one or more memories, and one or more computer readable hardware storage devices, said one or more hardware storage devices containing program code executable by the one or more processors via the one or more memories to implement the methods of embodiments.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In embodiments, predicting resource availability in a given time period by leveraging profile data may be implemented using special purpose algorithms. For example, a special purpose algorithm may be implemented to analyze historical user of a resource, determine that factors are predictors of use of the resource by users, and/or predicting that there is a statistical likelihood that one or more users will use the resource during a period of time.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of email processing performed by one or more processors, said method comprising:
    transmitting a first email from a sender to N recipients, said N being an integer of at least 3, said first email comprising a first emoticon, an icon, a text query requiring a positive or negative response, and a text message, said first emoticon connoting said positive response, a selection of the icon by any recipient of the N recipients denotes said positive response by said any recipient, said text message directing each recipient to select the first icon to communicate said positive response if desiring to communicate said positive response, wherein not selecting the first icon implies a selection of said negative response; and
    in response to M recipients of the N recipients selecting the icon in the first email, transmitting a second email to the N recipients, said second email comprising the text query, the text message, a send icon, a third icon, a positive emoticon, a positive counter, a negative emoticon, and a negative counter, said integer M being in a range of 1<M<N, said positive counter displaying the integer M, and said negative counter displaying an integer N−M.

2. The method of claim 1, said method further comprising: displaying the second email to the N recipients.

3. The method of claim 2, wherein said displaying the second mail is performed in substantially real time in relation to selection by the icon by the M recipients.

4. The method of claim 1, wherein the method has attributes selected from a group consisting of:
    processing the first email minimizes clutter in email inboxes;
    the first email comprises at least one calendar event;
    processing the first email utilizes the first emoticon to allow at least one recipient of the N recipients to quickly react and share the at least one recipient's reaction with other recipients of the N recipients;
    processing the first email minimizes time spent by the N recipients or the sender in reviewing emails using the selected icon; and
    combinations thereof.

5. The method of claim 1, wherein the method has attributes selected from a group consisting of:
    processing the first email adds message sensitive content to the received email as the selected emoticon as a dynamic social collaboration tool between the plurality of recipients and the sender;
    processing the first email streamlines the workflow processing of the first email;
    processing of the first email integrates across multiple languages and email applications;
    processing of the first email communicates a cancellation of a calendaring event; and
    combinations thereof.

6. The method of claim 1, wherein additional contextual information is appended to supplement the selected icon.

7. The method of claim 6, wherein a new message or thread is started and is directed at only M recipients that selected the icon.

8. The method of claim 1, wherein:
    if the first email requires a predetermined number or dynamically determined number of responses from the N recipients, the sender requires the predetermined number or the dynamically determined number of responses that are required before sending a follow-up email as a reminder.

9. The method of claim 1, wherein processing the first email comprises sorting emails received from the M recipients based on the received selected icon.

10. A computer system, comprising: one or more processors; a memory coupled to the one or more processors; and a computer readable storage device coupled to the one or more processors, the storage device containing instructions executable by the one or more processors via the memory to implement a method of email processing, said method comprising:
    transmitting a first email from a sender to N recipients, said N being an integer of at least 3, said first email comprising a first emoticon, an icon, a text query requiring a positive or negative response, and a text message, said first emoticon connoting said positive response, a selection of the icon by any recipient of the N recipients denotes said positive response by said any recipient, said text message directing each recipient to select the first icon to communicate said positive response if desiring to communicate said positive response, wherein not selecting the first icon implies a selection of said negative response; and
    in response to M recipients of the N recipients selecting the icon in the first email, transmitting a second email to the N recipients, said second email comprising the text query, the text message, a send icon, a third icon, a positive emoticon, a positive counter, a negative emoticon, and a negative counter, said integer M being in a range of 1<M<N, said positive counter displaying the integer M, and said negative counter displaying an integer N−M.

11. The computer system of claim 10, said method further comprising:
    displaying the second email to the N recipients.

12. The computer system of claim 11, wherein said displaying the second mail is performed in substantially real time in relation to selection by the icon by the M recipients.

13. The computer system of claim 10, wherein the method has attributes selected from a group consisting of:
    processing the first email minimizes clutter in email inboxes;
    the first email comprises at least one calendar event;
    processing the first email utilizes the first emoticon to allow at least one recipient of the N recipients to quickly react and share the at least one recipient's reaction with other recipients of the N recipients;
processing the first email minimizes time spent by N recipients or the sender in reviewing emails using the selected icon; and
combinations thereof.

14. The computer system of claim 10, wherein the method has attributes selected from a group consisting of:
processing the first email adds message sensitive content to the received email as the selected emoticon as a dynamic social collaboration tool between the plurality of recipients and the sender;
processing the first email streamlines the workflow processing of the first email;
processing of the first email integrates across multiple languages and email applications;
processing of the first email communicates a cancellation of a calendaring event; and
combinations thereof.

15. The computer system of claim 10, wherein additional contextual information is appended to supplement the selected icon.

16. A computer program product, comprising a computer readable hardware storage device having computer readable program code stored therein, said program code containing instructions executable by one or more processors of a computer system to implement a method of email processing, said method comprising:
transmitting a first email from a sender to a N recipients, said N being an integer of at least 3, said first email comprising a first emoticon, an icon, a text query requiring a positive or negative response, and a text message, said first emoticon connoting said positive response, a selection of the icon by any recipient of the N recipients denotes said positive response by said any recipient, said text message directing each recipient to select the first icon to communicate said positive response if desiring to communicate said positive response, wherein not selecting the first icon implies a selection of said negative response; and
in response to M recipients of the N recipients selecting the icon in the first email, transmitting a second email to the N recipients, said second email comprising the text query, the text message, a send icon, a third icon, a positive emoticon, a positive counter, a negative emoticon, and a negative counter, said integer M being in a range of 1<M≤N, said positive counter displaying the integer M, and said negative counter displaying an integer N−M.

17. The computer program product of claim 16, said method further comprising:
displaying the second email to the N recipients.

18. The computer program product of claim 17, wherein said displaying the second mail is performed in substantially real time in relation to selection by the icon by the M recipients.

19. The computer program product of claim 16, wherein the method has attributes selected from a group consisting of:
processing the first email minimizes clutter in email inboxes;
the first email comprises at least one calendar event;
processing the first email utilizes the first emoticon to allow at least one recipient of the N recipients to quickly react and share the at least one recipient's reaction with other recipients of the N recipients;
processing the first email minimizes time spent by N recipients or the sender in reviewing emails using the selected icon; and
combinations thereof.

20. The computer program product of claim 16, wherein the method has attributes selected from a group consisting of:
processing the first email adds message sensitive content to the received email as the selected emoticon as a dynamic social collaboration tool between the plurality of recipients and the sender;
processing the first email streamlines the workflow processing of the first email;
processing of the first email integrates across multiple languages and email applications;
processing of the first email communicates a cancellation of a calendaring event; and
combinations thereof.

* * * * *